United States Patent [19]
Higbee

[11] 3,801,176

[45] Apr. 2, 1974

[54] MOVEABLE STORAGE CART SYSTEM

[75] Inventor: Roland K. Higbee, Cincinnati, Ohio

[73] Assignee: American Hospital Suppy Corporation, Evanston, Ill.

[22] Filed: Apr. 19, 1972

[21] Appl. No.: 245,562

[52] U.S. Cl............. 312/199, 104/258, 238/29, 238/148, 238/288, 238/339, 312/201
[51] Int. Cl... A47b 87/00, B61d 15/04, E01b 13/00
[58] Field of Search ...... 104/1 R, 28, 258; 105/170, 105/180; 108/102; 214/16 B; 238/288, 339, 29, 148; 312/199, 201

[56] References Cited
UNITED STATES PATENTS

| 2,521,057 | 9/1950 | Gantz et al. | 104/258 X |
| 2,915,195 | 12/1959 | Crosby | 312/199 |
| 2,166,704 | 7/1939 | Foulkes | 214/16 B |
| 681,567 | 8/1901 | McDermott | 238/339 X |
| 1,892,747 | 1/1933 | Gilmore et al. | 238/288 |
| 1,748,309 | 2/1930 | Rose | 104/28 |
| 2,544,924 | 3/1951 | Herold | 105/170 |
| 3,535,009 | 10/1970 | Cain | 312/199 |

FOREIGN PATENTS OR APPLICATIONS 1,009,990   3/1952   France................. 238/339

Primary Examiner—Gerald M. Forlenza
Assistant Examiner—Howard Beltran
Attorney, Agent, or Firm—Dawson, Tilton, Fellon & Lungmus

[57] ABSTRACT

A system of moveable storage carts which comprises a track assembly resting unsecuredly on a support surface in combination with a plurality of wheeled carts riding thereon, the cart wheels being fixed against swivel action relative to the carts.

11 Claims, 11 Drawing Figures

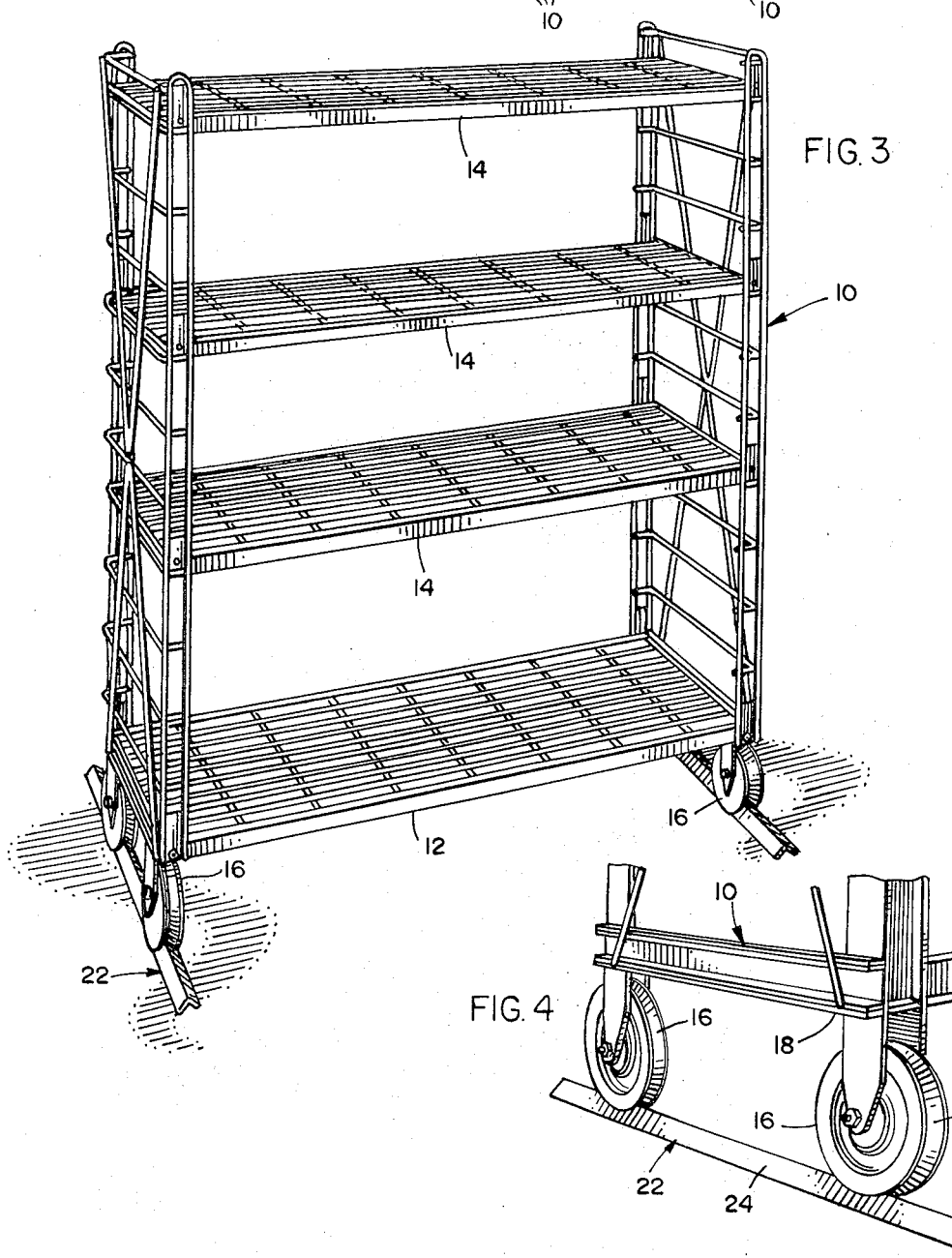

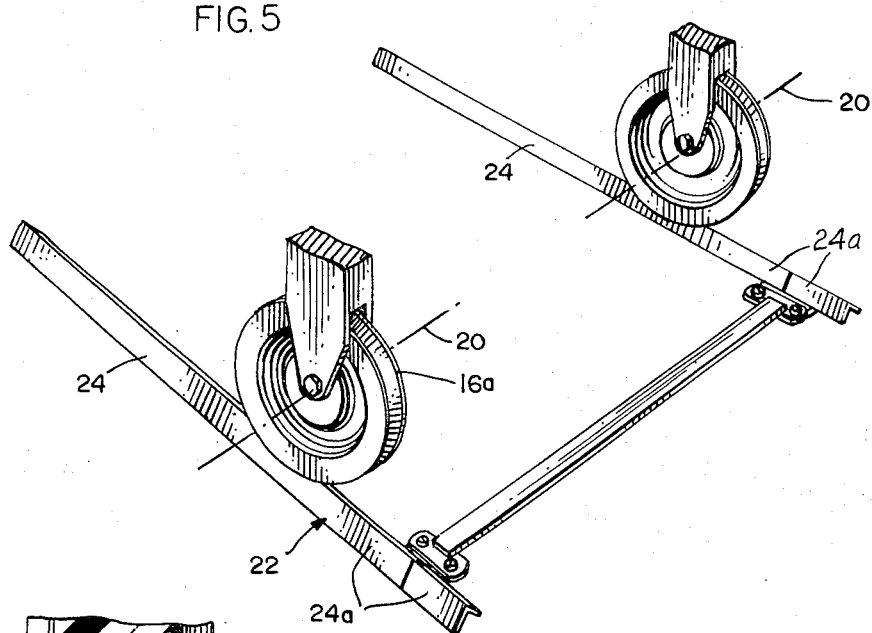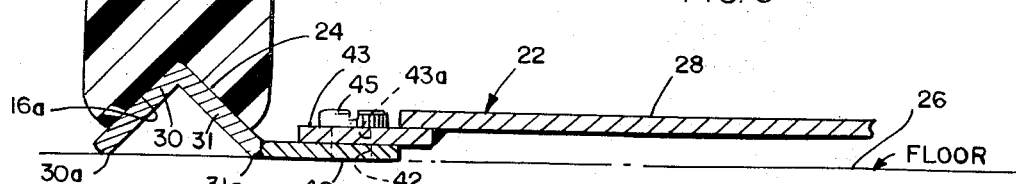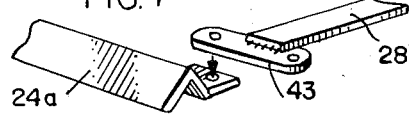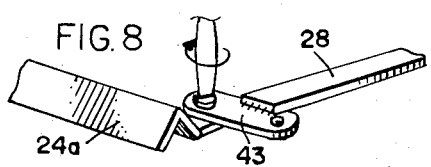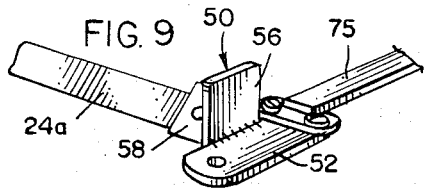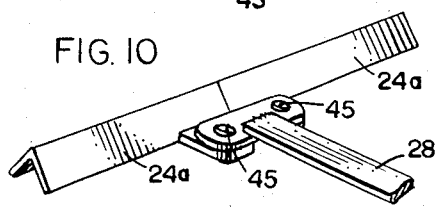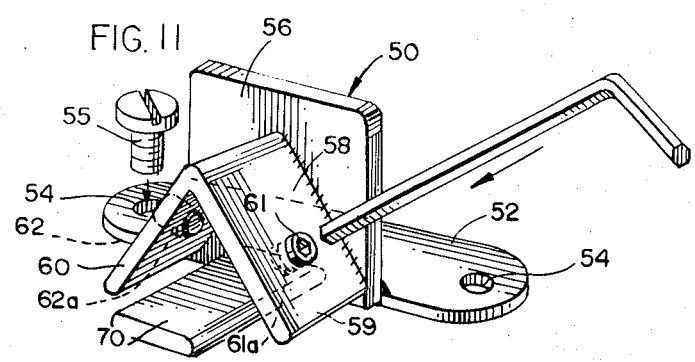

MOVEABLE STORAGE CART SYSTEM

BACKGROUND AND SUMMARY

The present invention relates to a system of moveable carts, such as wire shelf carts, guided for limited movement to provide maximum but readily accessible storage space. A track assembly resting freely on a support surface (i.e., without any direct attachment thereto) is employed in combination with a plurality of wheeled carts carried on the tracks. An important feature of the invention is that the cart wheels are fixed against swivel action relative to the carts.

While moveable cart or shelf systems of the prior art have included tracks with carts riding thereupon, limitations or difficulties in their construction and operation have prevented their widespread use. For example, prior track systems normally required the tracks to be bolted or otherwise secured to the floor. This had the effect of limiting the use of such systems to particular types of flooring and made such systems difficult to move to different areas as they became needed.

One aspect of this invention lies in the discovery that no direct floor attachment is required for a track assembly if the cart wheels are properly fixed against swivel action and if the track assembly is constructed to resist lateral and longitudinal movement upon the floor surface. The cooperating elements are so arranged to produce no torque forces on the tracks so that skew is eliminated while the desired movement along the rails is left uninhibited. Therefore, a system results that is moveable in its entirety for use on a variety of flooring surfaces; yet one that remains stable during such operations and use.

DRAWINGS

FIG. 1 is a top view of a plurality of moveable carts on tracks with an aisle selectively provided between the carts;

FIG. 2 is a top view as in FIG. 1 showing the carts moved along the tracks to provide an aisle there between in a different location;

FIG. 3 is a perspective view of a moveable cart riding on a track system or assembly;

FIG. 4 is a partial perspective view of the circumferentially grooved wheels of the cart of FIG. 3 riding upon a track of inverted V configuration;

FIG. 5 is a partial perspective view of a pair of grooved wheels riding upon a pair of rails connected by a transverse spanner;

FIG. 6 is an enlarged front elevational view of a rail of inverted V configuration with a grooved wheel riding thereon with a transverse spanner connected to the rail;

FIG. 7 is a perspective view showing the mating of an aperture in a rail tab and a slot of a spanner flange as a first step in providing an abutting connection between two rail segments;

FIG. 8 is a perspective view of a screw being utilized to attach the tab member and spanner flange;

FIG. 9 is a perspective view of a terminal bracket attached to the terminal end of a rail, a terminal spanner being attached to the bracket;

FIG. 10 is a perspective view of a completed abutting connection between rail segments utilizing the spanner member; and FIG. 11 is an enlarged perspective view of a terminal bracket prior to installation with engaging means in exploded relation thereto.

DESCRIPTION

Referring now to the drawings, in particular FIG. 3, there is shown a cart 10 having a generally rectangular base 12 and a plurality of generally rectangular shelves 14 thereabove. As will be seen, any shape of cart would be possible, but space requirements normally dictate the use of rectangular or square shaped carts. Adjacent to each corner of the base are wheeled castors 16. Each of these wheels 16 is fixed against swivel action relative to the base 12, as best shown in FIG. 4 at 18. These wheels are attached so that their axes of rotation 20 (as shown in FIG. 5) are transverse to the rails of the track system or assembly generally indicated by the numeral 22. In one prefered embodiment the wheels 16 are arranged in one pair of parallel planes, thereby requiring only two longitudinal rails 24. Of course, if the wheels 16 were staggered with respect to each other a greater number of rails 24 would be required. It is also believed apparent that a larger cart might require more than two sets of wheels and rails to provide adequate support for its load.

As noted, the wheels 16 are anchored against swivel action relative to the base 12 of cart 10. Such attachment restrains the lateral movement of the wheels without restraining the longitudinal movement along rails 24. As a result, torque forces which might otherwise tend to skew the rails 24 during movement of the cart 10 are virtually eliminated. Since each wheel has a V-shaped perimetric groove 16a receiving an upper portion of a rail, and since the spacing between the wheels of the carts is fixed, the carts themselves contribute in preventing lateral displacement of the rails on whatever support surface they rest. Since the entire track assembly 22 is not directly affixed to the surface 26, no damage to such surface is caused by installation of the system and the entire system may be easily and quickly moved to a different area or room. Also, because no direct fixation is required, almost any type of floor surface is usable as a support including hard surfaces such as concrete, tile, and the like, as well as soft or carpeted surfaces.

As most clearly shown in FIG. 6, each rail 24 is of inverted V configuration when viewed in cross-section, having upwardly and inwardly sloping side walls 30 and 31 with only the bottom surfaces 30a and 31a of the walls touching the supporting surface 26. Such construction promotes a solid gripping contact with the support which resists movement of the track assembly upon that surface. In conjunction with the rails 24, I employ a plurality of transverse spanners 28 which are detachably secured to the rails and which maintain such rails in parallel relation at a pre-determined spacing. Each rail is composed of a series of abutting, connected segments 24a (see FIG. 10) of substantially equal length. Furthermore, the complementary relationship between each inverted V-shaped rail and the grooved wheels supported thereon eliminates any possibility of lateral play that might otherwise result in abrupt side thrusts imposed on the rails as the carts are moved therealong. In other words, the groove 16a of each wheel is shallower than the outside configuration of rail 24, with the result that the wheels are self-seating and fit snugly upon such rails. Even slight relative lateral movement between the carts and the track system is prevented. As shown in FIGS. 6 and 7, each of the segments 24a has at end thereof a sidewardly projecting tab 40 provided with an aperture 42 (preferably threaded) therein. When two segments 24a are aligned with their ends in abutting relation, the tab members 40 of the respective segments are disposed in close proximity. Each spanner member 28 is provided at opposite ends with terminal flanges 43 which overlie the adjacent tabs of the aligned rails and which have openings 43a in register with the apertures 42 of the tabs. Screws 45, or any other suitable connecting means securely (but detachably) connect the flanges and the tabs and secure the parts together to form a rigid track assembly. It is believed evident that any number of rails and spanners may be so connected to provide an assembly of the desired length. Because the spanners lie atop the tabs, each spanner member 28 is spaced above the support surface 26. Such construction prevents the spanners from interfering with the gripping action of the edges 30a and 31a of the rails as previously described. Further, the elevated condition of the spanners facilitates assembly and installation, especially on resilient support surfaces such as carpeting.

At the terminal ends of each rail 24 I employ a bracket 50 which acts as a stop for the wheel 16 of the cart 10 as well as allowing terminal spanners to be connected between the ends of the rails 24 to further enhance stability of the track system 22 (FIGS. 9 and 11). Each bracket comprises a web 52 which engages the support surface 26. The web 52 includes a tab 54 for attaching a terminal spanner 75 between the terminal ends of the two rails 24. As shown in FIG. 11, an aperture 54 is provided for threadably receiving screw 55 for securely connecting the bracket and terminal spanner together. The bracket also includes an upstanding stop wall 56 which serves as a positive stop for the wheels 16. Joined to the stop wall 56 is a housing 58 of inverted V configuration which fits over the rail as shown in FIG. 9. In each side wall 59 and 60 of the housing I provide releasable attachment means to secure the rail and housing together. In the embodiment shown, the attachment means comprises screws 61 and 62 threadably received in holes 61a and 62a. A conventional Allen wrench 65 may be used to tighten screws 61 and 62 against the side walls 30 and 31 of rail 24. To further secure the terminal bracket 50 to rail 24, a generally horizontal tongue 70 extends from the stop wall 56 below the housing 58 and is received within the space defined by the V-shaped rail. The tongue not only reinforces the attachment between the housing and the rail but also, in combination with screws 61 and 62, provides a cinching action around the rail 24 when the screws are tightened.

Turning now to FIGS. 1 and 2, the operation of the system will be discussed. In these figures a top view of a plurality of carts 10 riding on rails 24 is shown. Because of the structural details outlined previously, the carts 10 roll on the rails 24 without producing any lateral thrust or torque forces on these rails. This allows the entire track system to rest unsecuredly on a generally horizontal support surface which provides the aforementioned advantages. When moved on the rails 24 an aisle 4 can be selectively fashioned between the carts 10 at whatever point is desired. Thus, a far greater number of shelf carts or units may be arranged within a given space, with their shelves selectively accessible from the open sides of the units (i.e., from the sides extending transversely with respect to the track assembly), than if stationary shelving units were provided, since multiple transverse aisles extending between the carts are unnecessary. Only a single aisle is required, the carts being shifted along the track to form that aisle wherever access is desired.

While an embodiment of the invention has been described in considerable detail, it is believed apparent that persons skilled in the art will be able to substitute elements equivalent to those disclosed and to modify the illustrated embodiment without departing from the inventive principles; and it is, therefore, intended that all such modifications and equivalence be covered as they are embraced in the spirit and scope of the invention.

I claim:

1. A system of moveable carts which comprises a substantially horizontal support surface, a track resting upon said surface, a plurality of carts having wheels riding upon said track, said wheels having their axes of rotation transverse to said track and being fixed against swivel action relative to said cart, said track comprising at least two straight parallel rails of inverted V-shaped cross-section in conjunction with a plurality of transverse spanners connecting said rails, said rails each having a pair of narrow spaced parallel lower edge portions resting freely upon said supporting surface, said cart wheels being provided with V-shaped circumferential grooves receiving the upper portions of said rails.

2. The system of claim 1 wherein each of said rails comprises a series of longitudinally-aligned rail segments, and means detachably connecting said segments together.

3. The system of claim 2 wherein said means includes laterally projecting tabs provided by said rail segments at the adjacent ends thereof, and means detachably joining tabs of adjacent segments together.

4. The system of claim 3 wherein said means for detachably joining said tabs includes a terminal flange at each end of said spanner, said flange extending over the tabs of adjacent rail segments, and coupling means detachably joining each flange to the tabs disposed thereunder.

5. The system of claim 1 in which the groove in each wheel fits snugly over the outer surface of said inverted V-shaped rails and is shallower than the dimensions of said outer surface.

6. The system of claim 4 in which each spanner has its intermediate portion spaced above the level of said flanges.

7. The system of claim 1 wherein a terminal bracket is disposed at the terminal end of each of said rails, said bracket comprising a web engaging said support surface, terminal spanners detachably connected to and extending between said webs of said brackets, each bracket having a housing of inverted V configuration overlying said rail and having an upstanding stop wall adapted to be engaged by and limit movement of a wheel of one of said carts.

8. The system of claim 7 in which said terminal bracket includes a tongue received within the inverted V configuration of said rail to further secure said rail within said housing.

9. A storage system comprising a plurality of wheeled carts independently moveable along a generally horizontal track adapted to rest upon a floor surface, said track comprising a plurality of straight rails each being of generally inverted V-shaped cross-sectional configuration and being secured together in parallel relation by transverse spanning elements, said inverted V-shaped rails each having a pair of narrow spaced parallel bottom portions adapted to rest freely upon the floor surface and said spanning elements being disposed no lower than said bottom portions, each of said carts having a plurality of elongated shelves extending in a direction transverse to said track and being accessible for loading and unloading along the longitudinal sides thereof, said carts having their wheels fixed thereto against swivel action and provided with V-shaped circumferential grooves snugly receiving the upper portions of said V-shaped rails.

10. The system of claim 9 in which each rail comprises a series of aligned rail segments, said spanners detachably connecting said segments together.

11. The system of claim 10 in which each of said spanners is along at least a major portion of the length thereof spaced above the level of said bottom portions of said rails.

* * * * *